(12) United States Patent
Jurca et al.

(10) Patent No.: US 9,317,528 B1
(45) Date of Patent: Apr. 19, 2016

(54) IDENTIFYING GEOGRAPHIC FEATURES FROM QUERY PREFIXES

(71) Applicant: Google Inc., Mountain View, CA (US)

(72) Inventors: Radu Jurca, Adliswil (CH); Anja Hauth, Zurich (CH); Ivan Zauharodneu, Zurich (CH); Matsvei Zhdanovich, Zurich (CH); Luuk van Dijk, Zurich (CH); Steffen Meschkat, Zurich (CH); David E. Lecomte, Zurich (CH)

(73) Assignee: Google Inc., Mountain View, CA (US)

( * ) Notice: Subject to any disclaimer, the term of this patent is extended or adjusted under 35 U.S.C. 154(b) by 359 days.

(21) Appl. No.: 13/953,293

(22) Filed: Jul. 29, 2013

Related U.S. Application Data

(63) Continuation of application No. 13/071,746, filed on Mar. 25, 2011, now Pat. No. 8,515,973.

(60) Provisional application No. 61/440,827, filed on Feb. 8, 2011.

(51) Int. Cl.
*G06F 7/00* (2006.01)
*G06F 17/30* (2006.01)

(52) U.S. Cl.
CPC ...... *G06F 17/30241* (2013.01); *G06F 17/3087* (2013.01)

(58) Field of Classification Search
CPC .......... G06F 17/30864; G06F 17/3087; G06F 17/30241; G06F 17/30873
USPC .................................. 707/730, 750, 724, 748
See application file for complete search history.

(56) References Cited

U.S. PATENT DOCUMENTS

| | | | |
|---|---|---|---|
| 6,381,603 B1 | 4/2002 | Chan et al. | |
| 6,564,213 B1 | 5/2003 | Ortega et al. | |
| 7,136,845 B2 | 11/2006 | Chandrasekar et al. | |
| 7,428,525 B1 | 9/2008 | Grasteit | |
| 7,487,145 B1 | 2/2009 | Gibbs et al. | |
| 7,725,485 B1 | 5/2010 | Sahami et al. | |
| 7,836,044 B2 | 11/2010 | Kamvar et al. | |
| 7,849,080 B2 | 12/2010 | Chang et al. | |
| 2001/0011270 A1* | 8/2001 | Himmelstein et al. | 707/3 |

(Continued)

OTHER PUBLICATIONS

Gan et al., Analysis of Geographic Queries in a Search Engine Log, LocWeb 2008, Apr. 22, 2008, Beijing, China, pp. 49-56.*

(Continued)

*Primary Examiner* — Cheyne D Ly
(74) *Attorney, Agent, or Firm* — Fish & Richardson P.C.

(57) ABSTRACT

Methods, systems, and apparatus, including computer programs encoded on a computer storage medium, for identifying geographic features. In one aspect, a method includes receiving a query. Geographic features are identified, each geographic feature being associated with one or more names, each geographic feature being associated with at least one name that includes the query. A feature-query score is computed for each geographic feature, including: for each name of the geographic feature that includes the query, identifying a computed feature-name score, wherein the feature-name score is computed based on a count of a number of occurrences of the name in a query log, wherein each occurrence is attributed to the feature; and computing the feature-query score based on the identified feature-name scores. The geographic features are ranked according to the feature-query scores.

21 Claims, 4 Drawing Sheets

(56) References Cited

U.S. PATENT DOCUMENTS

| | | | |
|---|---|---|---|
| 2003/0061211 A1* | 3/2003 | Shultz et al. | 707/3 |
| 2004/0236730 A1* | 11/2004 | Frank | 707/3 |
| 2008/0033982 A1 | 2/2008 | Parikh et al. | |
| 2008/0104056 A1 | 5/2008 | Li et al. | |
| 2009/0019028 A1* | 1/2009 | Norris et al. | 707/5 |
| 2012/0166450 A1 | 6/2012 | Choi et al. | |

OTHER PUBLICATIONS

Qingqing Gan et al., Analysis of Geographic Queries in a Search Engine Log, LocWeb 2008, Apr. 22, 2008, Beijing, China, pp. 49-56.

Andreas Henrich et al., Characteristics of Geographic Information Needs, GIR'07, Nov. 9, 2007, Lisboa, Portugal, pp. 1-6.

* cited by examiner

IDENTIFYING GEOGRAPHIC FEATURES FROM QUERY PREFIXES

CROSS-REFERENCE TO RELATED APPLICATIONS

This application is a continuation of U.S. patent application Ser. No. 13/071,746, entitled "IDENTIFYING GEOGRAPHIC FEATURES FROM QUERY PREFIXES," filed Mar. 25, 2011, which claims the benefit under 35 U.S.C. §119(e) of U.S. Patent Application No. 61/440,827, entitled "IDENTIFYING GEOGRAPHIC FEATURES FROM QUERY PREFIXES," filed Feb. 8, 2011, and are incorporated herein by reference in their entirety.

BACKGROUND

This specification relates to digital information processing and, in particular, to identifying geographic features from query prefixes.

Interactive geographic maps can be viewed in web browsers and other software. A user can view an interactive geographic map for a desired location which can include information pertaining to surrounding businesses, business addresses, contact information, and driving directions, for example. Some interactive maps allow users to manipulate the maps to view adjacent sections, zoom in or out, or view satellite images of their desired location.

Interactive mapping systems may provide potential results in response to received queries. Potential results may be provided as a user types each letter of the query, rather than after the entire query has been submitted.

SUMMARY

In general, one innovative aspect of the subject matter described in this specification can be embodied in methods that include the actions of receiving a query. Geographic features are identified, each geographic feature being associated with one or more names, each geographic feature being associated with at least one name that includes the query. A feature-query score is computed for each geographic feature, including: for each name of the geographic feature that includes the query, identifying a computed feature-name score, wherein the feature-name score is computed based on a count of a number of occurrences of the name in a query log, wherein each occurrence is attributed to the feature; and computing the feature-query score based on the identified feature-name scores. The geographic features are ranked according to the feature-query scores. Other embodiments of this aspect include corresponding systems, apparatus, and computer programs, configured to perform the actions of the methods, encoded on computer storage devices.

These and other embodiments can each optionally include one or more of the following features. The actions further include providing one or more potential results using the names of the geographic features ordered by the ranking of the geographic features. The actions further include receiving indication of a selected potential result; and providing map data corresponding to the selected potential result. Computing a feature score includes: for each name of the geographic feature, computing a feature-name score using the query log; and computing the feature score based on the feature-name scores. Computing a feature-name score includes: dividing a number of counts of the name attributed to the geographic feature by a total number of counts of the name in the query log. Each geographic feature is associated with a prominence score, and wherein dividing the number of counts of the name attributed to the geographic feature by a number of counts of the name comprises dividing the geographic feature's prominence score by the sum of prominence scores for all geographic features being associate with the name. The query log includes, for each query in the log, information describing what geographic feature a user selected after submitting the query; and the number of counts of the name attributed to the geographic feature is the number of times that the name occurs in the query log with queries having information describing that the geographic feature was selected. The query log includes, for each query in the log, information describing what geographic feature was provided to a user in response to the query; and the number of counts of the name attributed to the geographic feature is the number of times that the selected name occurs in the query log with queries having information describing that the geographic feature was provided. Computing the feature score based on the feature-name scores includes selecting a maximum feature-name score from the feature-name scores.

Particular embodiments of the subject matter described in this specification can be implemented so as to realize one or more of the following advantages. Geographic features can be identified from query prefixes. By using query logs, geographic features can be identified that are more likely of interest to a user submitting a query prefix. Potential results and expanded potential results can be provided in connection with an interactive mapping system based on geographic features rather identified from query prefixes. Users' time can be saved in finding geographic features. Users can discover geographic features, e.g., features they may not have expected to find.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
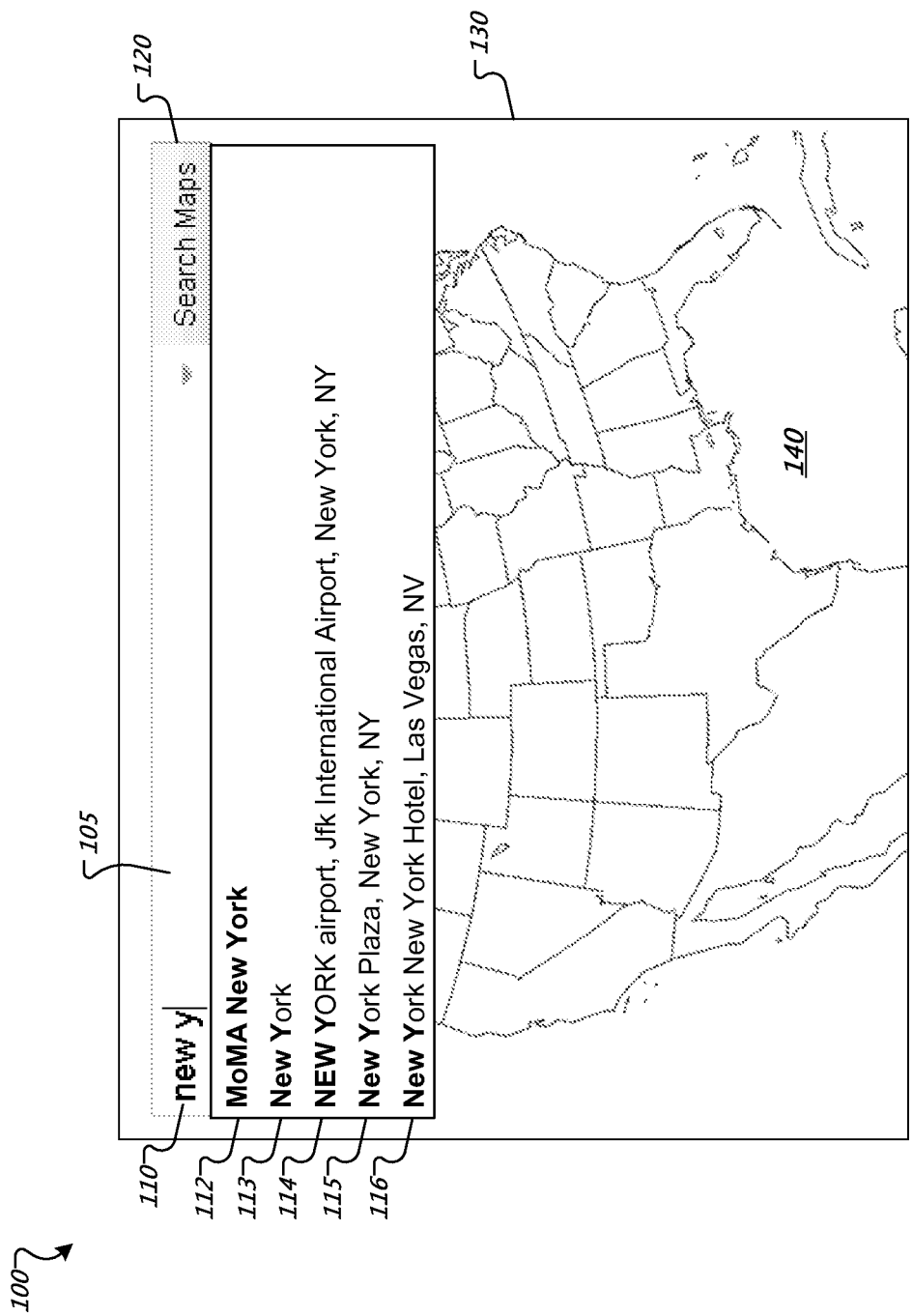
FIG. 1 is a diagram of an example graphical user interface for an interactive mapping system.

FIG. 1 is a diagram of an example graphical user interface 100 for an interactive mapping system. Users of the system can search for map data by submitting queries. In response to received queries, an interactive view mapping system provides map data in the form of map images.

A user of the interactive mapping system can enter a query 110 into a query box 105. By clicking a "search maps" button 120, for example, the interactive mapping system can retrieve map data 140 and present the map data 140 in a viewport 130. The viewport defines a range of current map coordinates to be displayed on a client device.

The interactive mapping system can also provide potential results, such as potential results 112, 113, 114, 115, and 116.

A potential result can be a name of a geographic feature that, when selected by a user, causes the interactive mapping system to display the geographic feature in the viewport 130, e.g., instead of performing a search for the potential result. In some implementations, a potential result is a potential completed query based on characters that the user has already entered, e.g., typed or spoken. For example, suggestion 113 ("New York") corresponds to a potential completed query ("New York") based on the query 110 that has already been typed ("new y"). Multiple potential completed queries are possible for any partial query. Other potential results are possible, including those described below.

The interactive mapping system can provide potential results as a user enters characters of a query, e.g., updating the potential results after each character. This is useful, for example, to disambiguate a query as a user enters the query. By looking at the potential results, the user can determine whether selecting one will cause the viewport to display a very different location or zoom in to location already shown.

The interactive mapping system can also provide expanded potential results. For example, in FIG. 1, the interactive mapping system identified "MoMA New York" ("MoMA is an abbreviation for "Museum of Modern Art") as an expanded potential result 112. This expanded potential result was provided because the suggestion is likely to be relevant to users searching for "New York," even though "MoMA" was not contained in the query 110. In other words, while potential results 113, 114, 115, 116 can be queries that a user may have eventually typed, expanded potential result 112 is provided as a relevant suggestion even though, based on the partial query 110, the user could not have eventually typed "MoMA New York."

In some implementations, expanded potential results are related to the original queries in certain ways. For example, an expanded potential result may be a name of a geographic feature contained within a region whose name was identified by the original query or a potential completed query. For example, the Museum of Modern Art in New York City is contained within a region ("New York City") with a name matching the potential completed query "New York." As a result, "MoMA New York" is suggested for the partial original query "new y."

In some implementations, a potential result can be related to the original query because the potential result is associated with a geographic feature having a name related to the original query, even though the potential result is not within a region whose name was identified by the original query or a potential completed query. For example, potential result 116 ("New York New York Hotel, Las Vegas, NV") refers to a hotel in Las Vegas having a name similar to "New York" but located far from the city or state of New York. In this example, the system does not determine that "new y" refers to New York; instead, it identifies "New York New York Hotel" as a prominent business listing having a name that begins with "new y."

Figure 2:
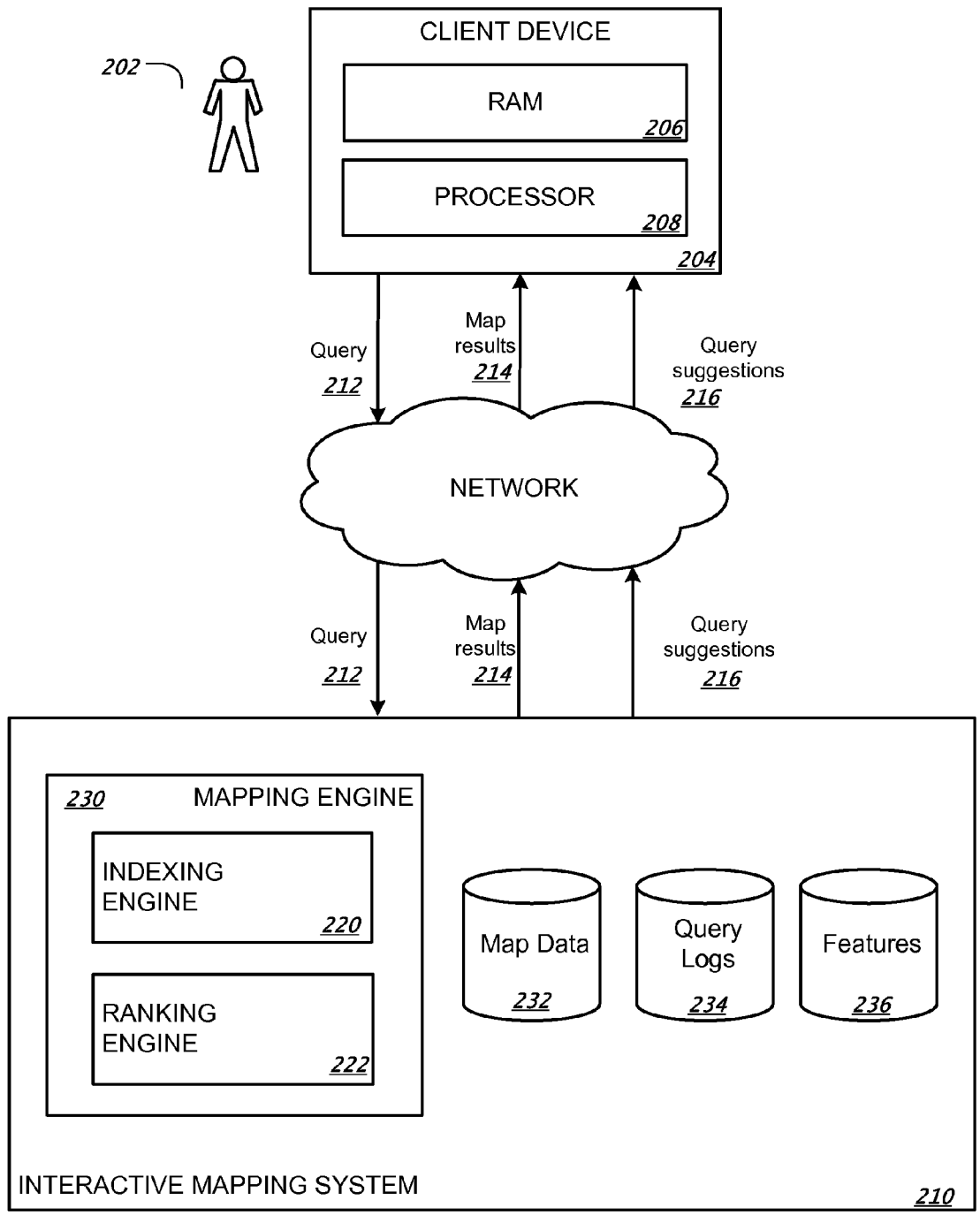
FIG. 2 is a schematic diagram an example interactive mapping system.

FIG. 2 is a schematic diagram of an example interactive mapping system 210. The interactive mapping system 210 can provide map data relevant to submitted queries as can be implemented in an internet, an intranet, or another client and server environment. The interactive mapping system 210 is an example of an information retrieval system in which the systems, components, and techniques described below can be implemented.

A user 202 can interact with the interactive mapping system 210 through a client device 204, e.g., a personal computer, a smart phone, or a tablet computer. For example, the client 204 can be a computer coupled to the interactive mapping system through a local area network (LAN) or wide area network (WAN), e.g., the Internet. The client device 204 will generally include a random access memory (RAM) 206 and a processor 208.

A user 202 can submit a query 212 to a mapping engine 230 within an interactive mapping system 210. When the user 202 submits a query 212, the query 212 is transmitted through a network to the interactive mapping system 210. The interactive mapping system 210 can be implemented as, for example, computer programs running on one or more data processing apparatus (e.g., computers) in one or more locations that are coupled to each other through a network. The interactive mapping system 210 includes a mapping engine 230. The interactive mapping system 210 responds to the query 212 by generating map results 214, which are transmitted through the network to the client device 204 in a form that can be presented to the user 202 (e.g., as an interactive mapping system web page to be displayed in a web browser running on the client device 204).

The interactive mapping system 210 also provides potential results 216, which are also transmitted through the network to the client device 204. Potential results 216 can include expanded potential results, which may contain terms that were not indicated by the original query.

When the query 212 is received by the interactive mapping system 210, the mapping 230 identifies map results 214 that correspond to the query 212. Map results can be retrieved from a corpus of map data 232. The map data 232 can be stored in various data structures, e.g., directed graphs and tries. An indexing engine 230 can index the potentially multiple names of features contained in the corpus of map data 232.

The interactive mapping system 210 stores information relating to geographic features, including feature names and related information, in a features database 236. A geographic feature is any place, entity, object or structure, or the like that is associated with a geographic location or region. Example features include countries, cities, mountains, regions, neighborhoods, streets, roads, bridges, buildings, lakes, parks, airports, and so on. Features can also include specific locations such as businesses, landmarks, points of interest, subway stops, and bus stops. Features can be associated with categories and subcategories, e.g., "hotels," "cheap hotels," "restaurants," "best restaurants," "doctors," and so on. Other features and feature names are possible.

Feature names and related information can be stored in various data structures. Table 1 illustrates an example features database including two features.

TABLE 1

| Feature ID | Feature Names | Prominence |
|---|---|---|
| feature1 | name, nother | 0.1 |
| feature2 | name | 0.2 |

Each row in table 1 represents an entry for a feature having a feature ID, one or more feature names, and a prominence score. A feature ID is, for example, a number or a string of characters that uniquely identifies a feature. A feature name is, for example, a name by which users refer to the feature (e.g., "New York," "New York City," and "NYC"). A prominence score is a number, for example on a scale of 0-1, that indicates the prominence of a feature. In general, a prominence score is related to the a-priori probability that a user would be interested in a feature, given that the user has not entered anything yet. Thus, a prominence score is independent of the name the user will use to refer to that feature. For example, a feature that is searched for more often (e.g., as indicated by query logs 234, discussed below) can be more prominent than a feature that is searched for less often. Various types of prominence scores can be used. A prominence score is not necessarily based on query log data. For example, a prominence score can be based on the number of people who live in a location of a feature, the number of people who visit a feature during a period of time, the number of times that a feature is referenced in a corpus of documents, and so on.

The interactive mapping system stores received queries in query logs 234. The query logs can be parsed by the indexing engine 220 to determine queries frequently submitted by users. The query log data can be anonymized before it is stored or used so that personally identifiable data is removed. For example, a user's identity may be anonymized so that no personally identifiable information can be determined for the user, and the data, if compromised, cannot be associated with a particular user or user identifier. The query log data can be aggregated so that queries are counted without being associated with users or user devices. Table 2 illustrates an example query log including two queries.

TABLE 2

| Query | Count |
|---|---|
| name | 9 |
| nother | 12 |

Each row in table 2 represents a query and information about how often the query was submitted. The query column lists the queries "name" and "nother," which are also names associated with example features in table 1. The count column provides the number of times that each query has been submitted (e.g., over a period of time). Thus "name" has been submitted 9 times and "nother" has been submitted 12 times.

Figure 3:
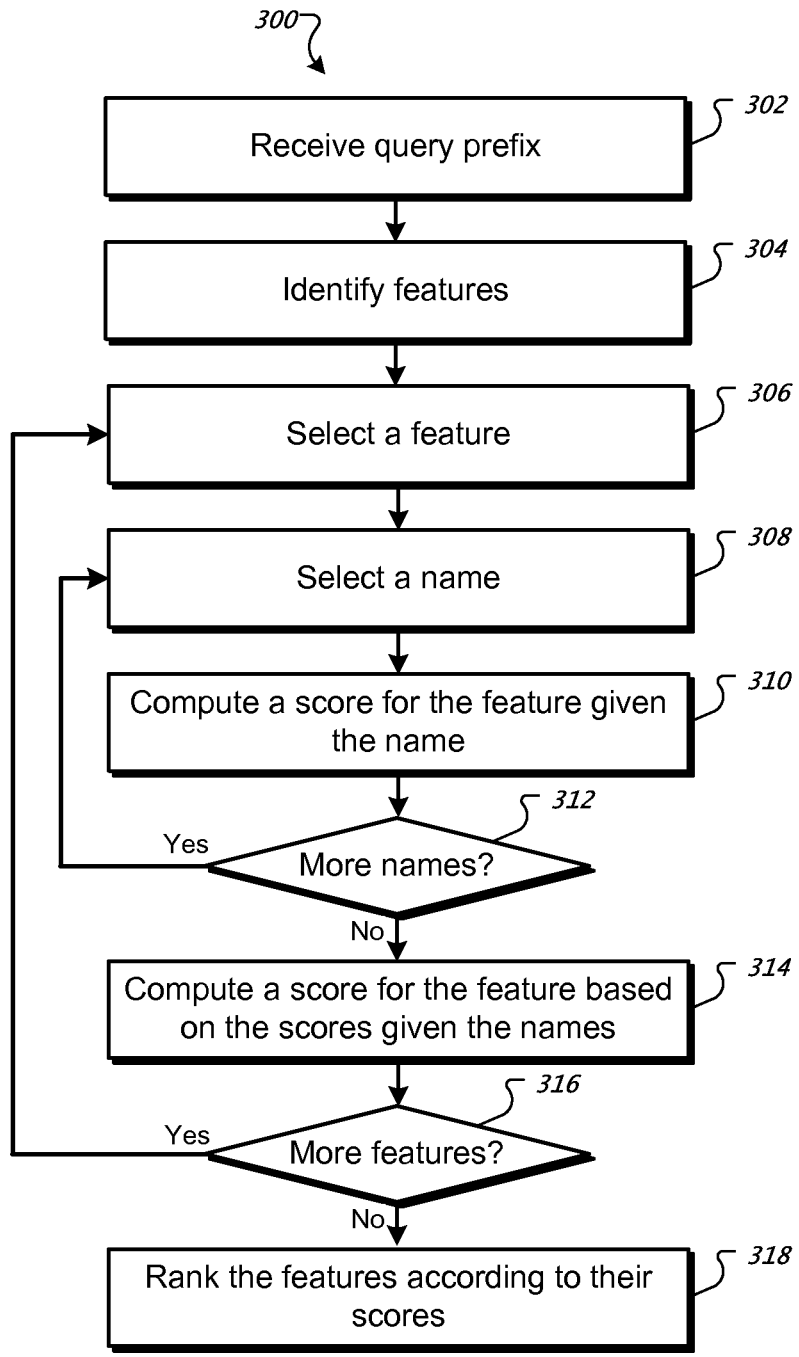
FIG. 3 is a flow diagram of an example technique for ranking features.

FIG. 3 is a flow diagram of an example technique 300 for ranking features. In some implementations, the technique 300 is performed by a system of one or more data processing apparatus. For purposes of illustration, the technique 300 will be described with respect to a system that performs the technique 300.

The system receives a query prefix (step 302). A query prefix is one or more characters. For example, the query prefix can be one or more characters entered by a user into a client device and transmitted to an interactive mapping system. Although the technique 300 is described for a received query prefix, more generally, the system can use any query or part of query. For example, consider a query where a user deletes a part of a query from a word in the middle, e.g., resulting in "Guanta Bay Cuba." The system can use, e.g., "guanta" as the query prefix in the following steps.

The system identifies features (step 304). Each feature is associated with one or more names and optionally a prominence score and other information. In some implementations, the system identifies features by selecting all features in a features database. In some implementations, the system identifies features by selecting features that are associated with names that include the query prefix or begin with the query prefix. For example, consider the query prefix "n" and the example features database illustrated by table 1. Each of the features has a name that starts with "n" so each feature can be an identified feature.

The system selects a feature (step 306). For example, the system can select features from the identified features in alphabetical order, or in order of feature IDs, or randomly. Typically, the system selects features in order of a rank of some other measure that maximizes the chances of returning relevant suggestions. For example, the system can select features in order of prominence scores. The system selects a name (step 308). For example, the system can select names in alphabetical order, in an order defined by a feature database, or randomly.

The system computes a score for the selected feature given the selected name (step 310). The score can be referred to as a feature-name score. The score is indicative of the probability that a user who submits the selected name as a query is searching for the selected feature. For example, consider the feature of New York City and the name "New York." A user who submits the name "New York" as a query to an interactive mapping system could be searching for the feature New York City or other features, e.g., New York state or a hotel in Las Vegas. The score for the feature New York City given the name "New York" is indicative of the probability that a user who submits "New York" as a query is actually searching for the feature New York City. The score can also depend on the user. For example, if the system determines that a user is associated with a certain language, the system can adjust scores for features of regions where the language is commonly spoken.

In some implementations, the system computes the score $P(feature|name)$ using a query log (e.g., query logs 234 of FIG. 2 and the example query log illustrated by table 2). The system can use the following equations:

$$P(feature|name) = (counts\ of\ name\ attributed\ to\ feature)/(counts\ of\ name).$$

In this equation, "feature" refers to the selected feature, and "name" refers to the selected name. The other items in parentheses refer to information that is based on a query log. Each item will be described in detail in the following paragraphs, and then example computations will be shown.

"Counts of name" refers to the number of times that the selected name occurs in the query log. Because the query log typically includes a record of submitted queries for a period of time, the number of times that the selected name occurs in the log typically reflects the number of submitted queries for the period of time; however, some queries can contain the same name twice, e.g., "new york new york."

"Counts of name attributed to feature" refers to the number of times that the selected name occurs in the query log and is attributed to the selected feature. The system can attribute occurrences of the name in the query log to the feature in various ways. For example, in some implementations, the query log includes information describing what feature a user ultimately selected after submitting a query, or what feature the system ultimately provided to the user in response to the query.

The system can provide different features in response to the same query when the query is submitted under different circumstances, e.g., by a different user, at a different time, or by the same user from a different location. For example, when a user's client device is displaying a viewport (e.g., the viewport 130 of FIG. 1) of a certain geographic region, the system can provide features within that geographic region. The system can attribute a query to the feature that was ultimately selected by or provided to the user.

In another example, the system can attribute occurrences of the name in the query log to the feature using prominence scores. The system can attribute occurrences of the name in the query log using an assumption that a feature with a higher prominence score should be attributed to more occurrences of the name than a feature with a lower prominence score. For instance, the system can attribute an occurrence of the name across all features having the name in proportion to the prominence scores of those features. If the features have the same prominence scores, for example, the system attributes the occurrence of the name evenly across the features. If one feature has a much higher prominence score, the system attributes the occurrence mostly (or all) to that feature.

To illustrate use of the equation, consider an example scenario where the system receives the query prefix "n" and uses the example feature log illustrated by table 1 and the example query log illustrated by table 2. The system can compute P(feature|name) using the prominence scores by dividing the prominence of the selected feature by the sum of the prominence scores for all features associated with the selected name. This is one example way to attribute occurrences of names in the query log to features. The results of these computations are shown in table 3.

TABLE 3

| | Computation | Result |
| --- | --- | --- |
| P(feature1 | "name") | 0.1/(0.1 + 0.2) * 9/(9 + 12) | 0.14 |
| P(feature1 | "nother") | 0.1/0.1 * 12/(9 + 12) | 0.57 |
| P(feature2 | "name") | 0.2/(0.1 + 0.2) * 9/(9 + 12) | 0.29 |

Table 3 shows the results of computing scores for both features, feature1 and feature2, and for both names associated with feature1, "name" and "nother." The system computes these scores by repeating the steps of selecting features and names as described further below.

The system determines whether there are more names associated with the feature (step 312), and if so, selects another name (return to step 308). For example, the system may determine whether there are more names associated with the feature that include the query prefix. By selecting names associated with the feature, the system computes scores for the feature given each associated name.

The system computes a score for the feature based on the scores given the names (step 314). The score can be referred to as a feature-query score. For example, system can use the following equations:

$$P(feature|prefix) = P(name|prefix) * P(feature|name),$$
where $$P(name|prefix) = (counts\ of\ name)/(counts\ of\ prefix).$$

In these equations, "feature" refers to the selected feature, and "name" refers to the selected name, and "prefix" refers to the received query prefix; "counts of name" refers to the same quantities described above with respect to step 310. The system uses P(feature|name) as described above with respect to step 310. "Counts of prefix" refers to the number of names in the query log that begin with the received query prefix. For example, consider the query prefix "n" and the example query log illustrated in table 2. The names "name" and "nother" both begin with the query prefix "n," and "name" occurred 9 times and "nother" occurred 12 times. So the counts of prefix for that log would be the sum of those occurrences, 21.

Because multiple names can be associated with a feature, multiple values for P(feature|prefix) can be computed. The final score for the feature based on the scores can be, for example, the largest score for all of the names associated with the feature, the average score of the names associated with the feature, a weighted combination of the scores of the names associated with the feature, and so on. In general, the final score can be any function of the scores of the names associated with the feature.

To illustrate these equations, consider the example scenario described above with respect to step 310 and resulting in the scores shown in table 3. The system can compute the score for feature1 for the prefix "n" as max(P(feature1|"name"), P(feature1|"nother"))=0.57. The system can compute the score for feature2 for the prefix "n" as P(feature2|"name")= 0.29.

The system determines whether there are more identified features (step 316), and if so, selects another feature (return to step 306). By selecting various identified features, the system computes scores for each feature.

The system ranks the identified features according to their scores as determined in step 314 (step 318). For example, the system can rank the identified features in the order of their scores. The resulting ranking reflects which features are likely to be response to a user typing the query prefix. The ranking can be used for various purposes, for example, for providing potential results.

In some implementations, the system counts entries in the query log to determine the above counts using n-grams of a portion of the query instead of the full query. For example, the system can count entries for "Gary Danko" even though the query is "Gary Danko Restaurant." This is useful, for example, to find multiple names in one query. In some implementations, the system counts spelling variations when counting entries in the query log. For example, the system can count entries in the query log for "restaurant" for the query "restaurant."

Figure 4:
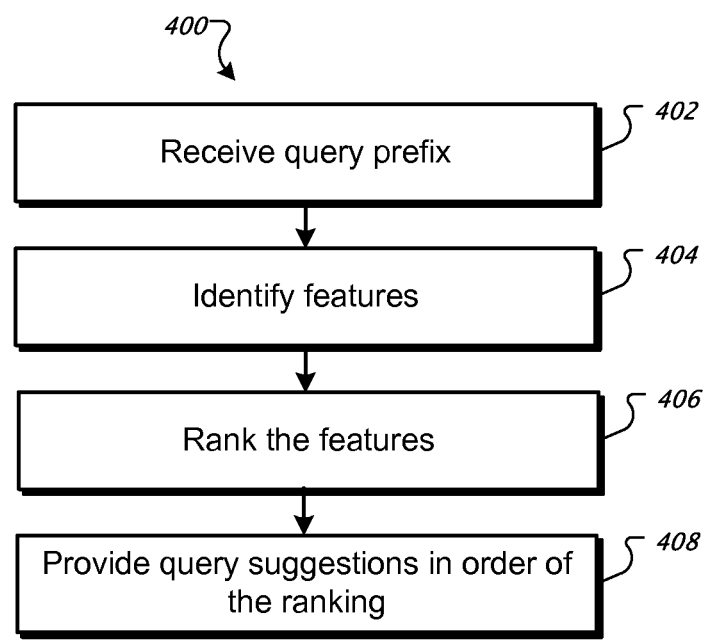
FIG. 4 is a flow diagram of an example technique for providing potential results.

FIG. 4 is a flow diagram of an example technique 400 for providing potential results. In some implementations, the technique 400 is performed by a system of one or more data processing apparatus. For purposes of illustration, the technique 400 will be described with respect to a system that performs the technique 400.

The system receives a query prefix (step 402). The system identifies features (step 404). The system ranks the features (step 406). The system can rank the features as described above with respect to FIG. 3.

The system provides potential results using the features in the order of the ranking (step 408). For example, the system typically provides a first potential result from the top ranked feature and then a second potential result from the next ranked feature. Each potential result can be, for example, a name for the feature designed as the most common name (e.g., because it occurs more frequently in a query log). The system can the provide additional potential results from additions features and, optionally, go back to the top of the ranking to provide a potential result that is another name associated with the top ranked feature. This is useful, for example, to increase the diversity of features suggested for a given query.

In another example, the system can provide as the top potential results all of the names associated with the top ranked feature, or all of the names associated with the top ranked feature that begin with the query prefix. The system can then provide all of the names associated with the next ranked feature, and continue until a maximum number of potential results is reached.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method executed by one or more processors, the method comprising:
   receiving a query;
   identifying a plurality of geographic features, each geographic feature being associated with a plurality of names that include the query;
   computing a feature-query score for each geographic feature, including:
      for each name of the geographic feature:
         attributing a number of occurrences in a query log of the name in the query to the geographic feature,
         counting the number of occurrences attributed to the geographic feature,
         receiving a prominence score associated with the geographic feature,
         identifying one or more other prominence scores respectively associated with one or more other geographic features that are associated with the name, and
         computing a feature-name score based on the number of occurrences in the query log, the number of occurrences attributed to the geographic feature, the prominence score, and the one or more other prominence scores;
      computing the feature-query score based on the feature-name scores; and
   ranking the geographic features according the feature-query scores.

2. The method of claim 1, further comprising providing one or more potential results using the names of the geographic features ordered by the ranking of the geographic features.

3. The method of claim 2, further comprising:
   receiving indication of a selected potential result; and
   providing map data corresponding to the selected potential result.

4. The method of claim 1, wherein computing a feature-name score includes:
   dividing a number of counts of the name attributed to the geographic feature by a total number of counts of the name in the query log.

5. The method of claim 4, wherein:
   the query log includes, for each query in the log, information describing what geographic feature a user selected after submitting the query; and
   the number of counts of the name attributed to the geographic feature is the number of times that the name occurs in the query log with queries having information describing that the geographic feature was selected.

6. The method of claim 4, wherein:
   the query log includes, for each query in the log, information describing what geographic feature was provided to a user in response to the query; and
   the number of counts of the name attributed to the geographic feature is the number of times that the selected name occurs in the query log with queries having information describing that the geographic feature was provided.

7. The method of claim 1, wherein computing the feature-query score based on the feature-name scores includes selecting a maximum feature-name score from the feature-name scores.

8. A system comprising one or more processors configured to execute operations comprising:
   receiving a query;
   identifying a plurality of geographic features, each geographic feature being associated with a plurality of names that include the query;
   computing a feature-query score for each geographic feature, including:
      for each name of the geographic feature:
         attributing a number of occurrences in a query log of the name in the query to the geographic feature,
         counting the number of occurrences attributed to the geographic feature,
         receiving a prominence score associated with the geographic feature,
         identifying one or more other prominence scores respectively associated with one or more other geographic features that are associated with the name, and
         computing a feature-name score based on the number of occurrences in the query log, the number of occurrences attributed to the geographic feature, the prominence score, and the one or more other prominence scores;
      computing the feature-query score based on the feature-name scores; and
   ranking the geographic features according the feature-query scores.

9. The system of claim 8, the operations further comprising providing one or more potential results using the names of the geographic features ordered by the ranking of the geographic features.

10. The system of claim 9, the operations further comprising:
  receiving indication of a selected potential result; and
  providing map data corresponding to the selected potential result.

11. The system of claim 8, wherein computing a feature-name score includes:
  dividing a number of counts of the name attributed to the geographic feature by a total number of counts of the name in the query log.

12. The system of claim 11, wherein:
  the query log includes, for each query in the log, information describing what geographic feature a user selected after submitting the query; and
  the number of counts of the name attributed to the geographic feature is the number of times that the name occurs in the query log with queries having information describing that the geographic feature was selected.

13. The system of claim 11, wherein:
  the query log includes, for each query in the log, information describing what geographic feature was provided to a user in response to the query; and
  the number of counts of the name attributed to the geographic feature is the number of times that the selected name occurs in the query log with queries having information describing that the geographic feature was provided.

14. The system of claim 8, wherein computing the feature-query score based on the feature-name scores includes selecting a maximum feature-name score from the feature-name scores.

15. A non-transitory computer storage medium encoded with a computer program, the program comprising instructions that when executed by one or more computers cause the one or more computers to perform operations comprising:
  receiving a query;
  identifying a plurality of geographic features, each geographic feature being associated with a plurality of names that include the query;
  computing a feature-query score for each geographic feature, including:
    for each name of the geographic feature:
      attributing a number of occurrences in a query log of the name in the query to the geographic feature,
      counting the number of occurrences attributed to the geographic feature,
      receiving a prominence score associated with the geographic feature,
      identifying one or more other prominence scores respectively associated with one or more other geographic features that are associated with the name, and
      computing a feature-name score based on the number of occurrences in the query log, the number of occurrences attributed to the geographic feature, the prominence score, and the one or more other prominence scores;
    computing the feature-query score based on the feature-name scores; and
  ranking the geographic features according the feature-query scores.

16. The computer storage medium of claim 15, the operations further comprising providing one or more potential results using the names of the geographic features ordered by the ranking of the geographic features.

17. The computer storage medium of claim 16, the operations further comprising:
  receiving indication of a selected potential result; and
  providing map data corresponding to the selected potential result.

18. The computer storage medium of claim 15, wherein computing a feature-name score includes:
  dividing a number of counts of the name attributed to the geographic feature by a total number of counts of the name in the query log.

19. The computer storage medium of claim 18, wherein:
  the query log includes, for each query in the log, information describing what geographic feature a user selected after submitting the query; and
  the number of counts of the name attributed to the geographic feature is the number of times that the name occurs in the query log with queries having information describing that the geographic feature was selected.

20. The computer storage medium of claim 18, wherein:
  the query log includes, for each query in the log, information describing what geographic feature was provided to a user in response to the query; and
  the number of counts of the name attributed to the geographic feature is the number of times that the selected name occurs in the query log with queries having information describing that the geographic feature was provided.

21. The computer storage medium of claim 15, wherein computing the feature-query score based on the feature-name scores includes selecting a maximum feature-name score from the feature-name scores.

* * * * *